Aug. 20, 1963

W. L. MORRISON
METHOD AND APPARATUS FOR STORING AND
SHIPPING PERISHABLE MATERIAL 3,100,971

Filed April 10, 1961

INVENTOR.
WILLARD L. MORRISON
BY PARKER & CARTER
ATTORNEYS

Aug. 20, 1963 W. L. MORRISON 3,100,971
METHOD AND APPARATUS FOR STORING AND
SHIPPING PERISHABLE MATERIAL
Filed April 10, 1961 2 Sheets-Sheet 2

INVENTOR.
WILLARD L. MORRISON
BY PARKER & CARTER
ATTORNEYS

United States Patent Office 3,100,971
Patented Aug. 20, 1963

3,100,971
METHOD AND APPARATUS FOR STORING AND SHIPPING PERISHABLE MATERIAL
Willard L. Morrison, Lake Forest, Ill., assignor to Reliquefier Corporation, New York, N.Y., a corporation of New York
Filed Apr. 10, 1961, Ser. No. 101,823
4 Claims. (Cl. 62—64)

My invention relates to improvements in method and apparatus for storing and shipping perishable material.

One object of the invention is to provide method and apparatus whereby both frozen and fresh meat and vegetables may be simultaneously stored and shipped in the same container.

Another object is to provide means and apparatus for controlling the temperature of the unfrozen or fresh meat or vegetables in consonance with a far below zero temperature of the frozen material.

Another object is to make it possible to freeze material to a temperature far below zero and ship that material in the same container as fresh or unfrozen material while relying upon the refrigeration effect of the far below zero material as the source of cold to maintain the fresh material at a proper shipping and storing temperature.

While sides of meat would take up much space, are preferably shipped in fresh condition, that is between the temperatures of approximately 29 to 35 degrees F. just above freezing, hamburger and other small meat products and the like are preferably shipped in frozen condition and require less space than the sides of meat. Thus the cubage required for the fresh meat is much larger than the cubage required for the frozen meat in so far as particular shipments are concerned. Therefore, I propose a container which will have in it space for hanging fresh meat, space for storing frozen meat, means for conducting the cold from the frozen meat to the fresh meat space at controlled rate so that as the frozen material gradually gives up cold, rising in temperature, the cold from the frozen meat will under controlled conditions cool the fresh meat at such a rate that the fresh meat does not freeze.

Other objects will appear from time to time throughout the specification and claims.

My invention is illustrated diagrammatically in the accompanying drawings, wherein—

Like parts are indicated by like numerals throughout the specification and drawing.

Figure 1:
FIGURE 1 is a vertical section through a container embodying my invention.
Figure 1:
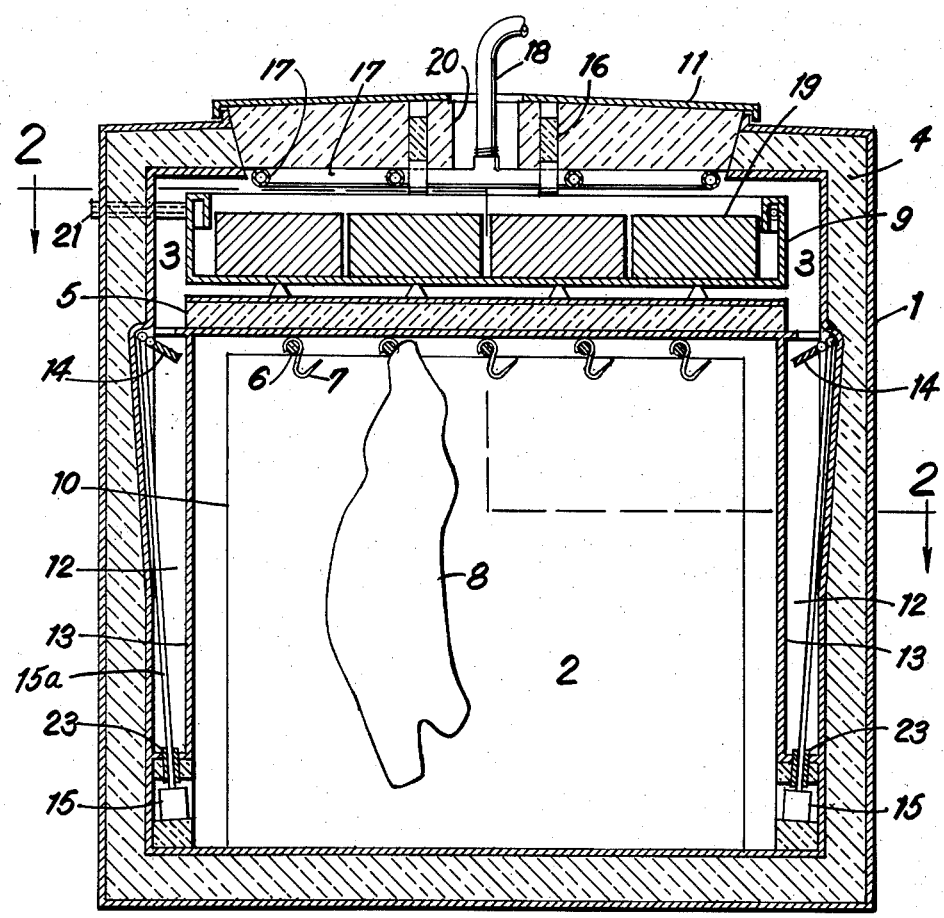
Figure 2:
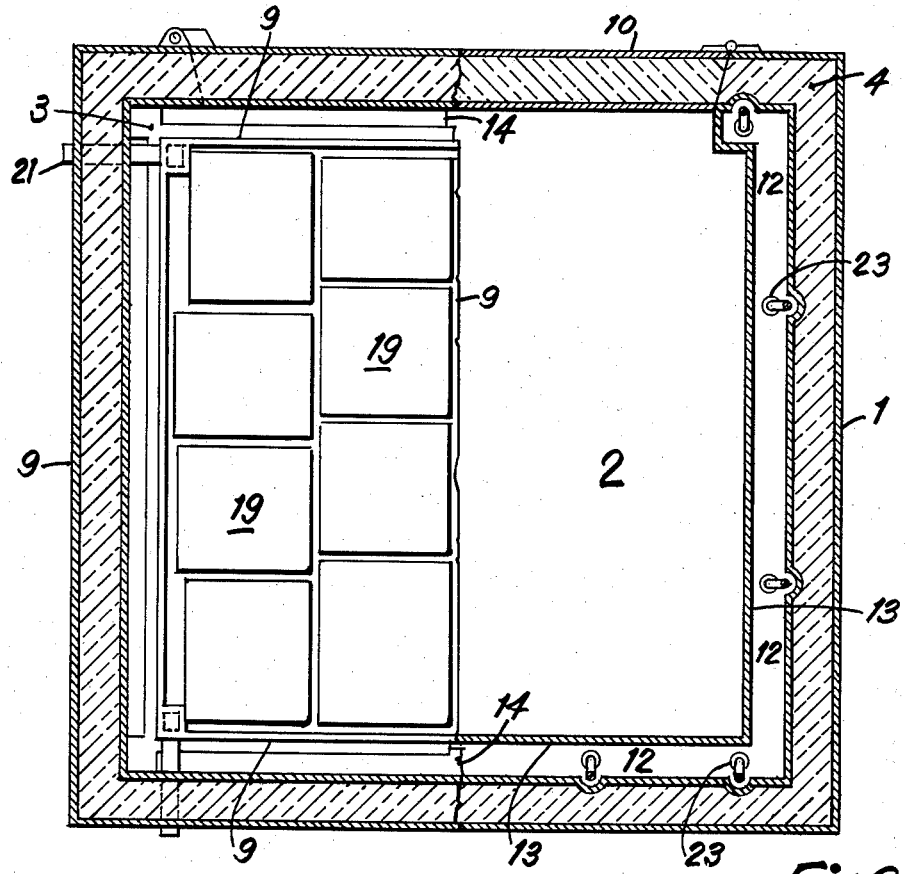
FIGURE 2 is a horizontal section along the line 2—2 of FIGURE 1.
Figure 3:
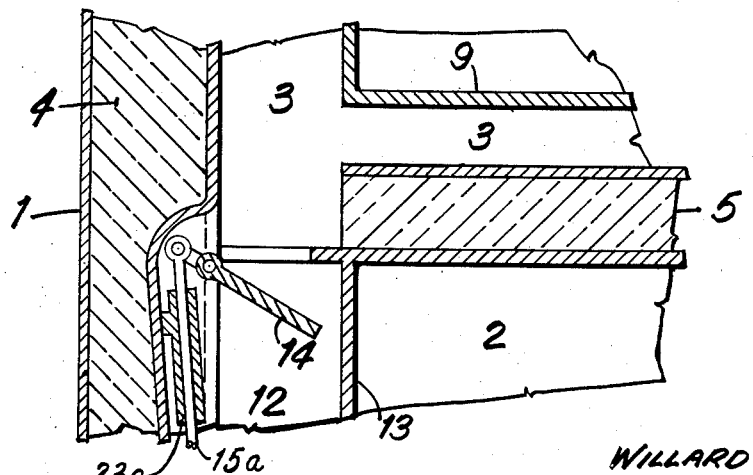
FIGURE 3 is a detail vertical section on an enlarged scale through the heat control valve.

I have for convenience illustrated my invention in a portable container. It might equally well be embodied in a freight car, a truck body, or even an ocean going ship or airplane.

The shipper container 1 encloses a relatively warm compartment 2 for storage and shipment of fresh meat and a relatively cold compartment 3 for storage and shipment of material frozen to temperatures far below zero degrees F.

The container is insulated at 4. The two compartments are separated by the insulating wall 5. The warm fresh meat compartment contains tracks 6 on which hooks 7 may be mounted to carry carcasses of fresh meat 8. The cold compartment 3 encloses a liquid tight open top frozen food pan 9 out of contact with the walls of the compartment for free flow of gas thereabout within the plenum chamber defined by the compartment. The two chambers are separately ported, the fresh food chamber 2 being closed by an insulating door 10, the frozen food chamber 3 being closed by an insulated hatch 11.

The sides of the fresh food chamber 2 except where interrupted by the insulating door 10 are bounded by vertically disposed heat transfer flues 12 having metallic heat conducting cold walls 13 exposed to the chamber 2. The flues extend downwardly from the plenum chamber 3 being controlled at their upper ends by flapper valves 14 adapted to be opened and closed by Sylphon bellows 15 in the chamber 2, the Sylphon bellows being exposed to the temperature prevailing in the warm chamber 2 and in response to the temperature in that chamber the bellows expand and contract to open or close the valves 14. As the temperature in the cold chamber falls, the bellows contract to close the valve 14. As the temperature in the warm chamber rises, the bellows expand to open the valve 14.

Mounted on the underside of the hatch 11, supported by brackets 16 is a perforate liquid distribution grid 17 adapted to receive from an outside source through duct 18 a suitable cold boiling liquid such as liquid nitrogen at substantially atmospheric pressure. When that liquid nitrogen is supplied to the grid 17, it showers onto the frozen food packages 19 which are preferably put in place before the hatch 11 is placed and are preferably though not necessarily at normal frozen food packing house temperatures at something below zero degrees F. As this nitrogen showers on the food packages, the nitrogen evaporates and the gas escapes through the vent 20 to atmosphere or for reliquefaction and reuse as the case may be.

It is desirable to feed the liquid nitrogen in at a rate such that it will not spill out of the pan 9. To insure against such spillage, the vent pipe 21 adjacent the top of the pan 9 will discharge liquid nitrogen if overflow is imminent outside the container.

I have shown each valve 14 connected to the Sylphon bellows 15 by push rod 15a in guide tube 23a. A packing 23 at the bottom of the flue 12 insures that the flue 12 be gas tight at the bottom. The bellows will operate through any suitable range of temperature for example, between 29 to 35 degrees F. so that when the bellows is exposed to the 29 degrees F. temperature, the valves 14 would be completely closed. When the bellows is exposed to 35 degrees F. temperature, the valves 14 would be wide open. Since the bellows respond to temperatures in between the valve opening will vary depending upon temperature.

The large vent 20 open while nitrogen is being supplied may be closed when the duct 18 is removed by the cap 22 with the check valve 24.

The use and operation of my invention are as follows:

Fresh meat from the packing house cold room at temperatures just above freezing are hung in the warm chamber in the usual manner. When the chamber is full, the insulating door is closed. Frozen food from the frozen food department is packed in the pan in the cold chamber and the cold chamber is then closed. The fresh meat when the chamber is full, will maintain a temperature at the start low enough to keep the valves 14 closed. When the cold chamber is closed, the liquid nitrogen is poured in to cool the contents of the cold chamber to a point far below zero degrees F. The temperature down to which this material is cooled depends upon conditions and time of shipment and may be determined mathematically or empirically as the case may be. As the nitrogen evaporates and the temperature falls in the cold room, no change takes place in the warm chamber, no liquid nitrogen being allowed to escape from the pan which contains the below zero frozen food. When the desired amount of liquid nitrogen has been supplied, the cap is applied to close the vent 20 and the assembly is ready for shipment. The warm chamber being filled with air and meat at substantially starting temperature something above and as close as possible to 29 degrees F. the meat freezing temperature because it is desirable to ship and store the fresh meat at temperature close to but not below the freezing point. Meanwhile the cold chamber is filled with cold nitrogen gas, the air having been expelled by the nitrogen and frozen food, the water of composition of which is far below zero degrees F.

It is the water of composition of this far below zero food which I propose to use as the refrigerant to maintain the temperature of the meat in the warm chamber below the danger point, for example, below 35 degrees F.

There will be heat infiltration into both chambers and the temperature in the two chambers will rise slowly, assuming that for example we start in the warm chamber with a temperature of 29 degrees F., the Sylphon bellows will keep the valve 14 closed. As temperature rises toward 35 degrees F. the Sylphon bellows responding to the rise in temperature will gradually open and cold gas will fall by gravity downwardly through the flues 12 from the cold chamber 3, expelling the relatively warm air or gas therein and cooling the cold or heat transfer walls 13, thus cooling the fresh meat storage chamber. As the temperature there drops, the bellows will gradually close the valves 14 before the danger freezing point is reached. Again as temperature rises, the cycle will be repeated. Thus during travel and storage the temperature in the chamber 2 is maintained closely within the desired range, for example from 29 to 35 degrees F. Meanwhile the temperature in the cold chamber will gradually fall but since the starting temperature may be several hundred degrees below zero degrees F., the same percentage of rise will be negligible and the gradual increase in temperature of the contents of the cold chamber will, if the temperature has been properly selected in the first place, permit the below zero material to arrive at destination at a temperature still far below zero degrees F., far below the dangerous point for shipment of frozen food while the fresh food will be cool but above the freezing point.

The sole refrigerant tending to maintain the temperature of the meat in the fresh meat compartment 2 is the deep frozen water of composition of the food in the cold chamber. That refrigerant does its work through the conducting, radiating walls 13. The cold walls 13 and the insulating wall 5 interpose a vapor proof barrier between the fresh meat and the source of cold so there can be no vapor migration of moisture from the meat to the cold material 19. Vapor migration stops at 13 and there the temperature differentiation between the walls 13 and the meat side 8 is so small that desiccation is reduced to a minimum and there is no escape from the warm chamber 2 of the moisture from the meat. Under ordinary circumstances there will not be any frosting on the surface 13 because before the temperature has come down to a point where frosting is dangerous, flow will be cut off by valve 14 ready for the next cycle.

It is important that the temperature in the warm fresh meat compartment never falls below freezing. The meat must arrive as fresh, not frozen meat. The control therefore of the flow of cold from the cold chamber down into the cooling flues is of the essence. It is equally desirable that there be no vapor migration from the fresh meat to the frozen meat first because that would desiccate the meat and second, because that would tend to insulate the frozen material and decrease its effectiveness as a refrigerant. It is the water of composition which serves as the refrigerant just as ice does in the usual ice and salt refrigerator car. The mere fact that the water of composition is found in the meat does not in any way decrease its effectiveness as a coolant. By this arrangement, all the cubage except that required for insulation is available for shipment of the food itself and the cold food is available to serve as the refrigerant to maintain the necessary temperature of the fresh, unfrozen food.

I have illustrated the preferred form. Under some circumstances, the cold gas from the cold chamber may be allowed to actually enter the fresh meat compartment, the essential thing being that control of flow of heat between the water of composition in the frozen food compartment and the fresh food be so controlled that the fresh food is not reduced below the freezing point.

I have illustrated my invention as applied primarily to meat but it is equally applicable to any food. The below zero food might be meat, the fresh food might be vegetable or vice versa. The temperatures still depend altogether on the convenience and need of the user. I have given for example temperatures of 35 degrees F. Perhaps a higher or lower aging temperature may be desired by the packer. In any case the Sylphon bellows or power source can be adjusted to give the desired temperature. The one limiting factor is that the fresh food be not frozen at any time during shipment and storage and that the frozen food always be below a desirable cold point, preferably below zero. At the out turn of the planned shipping period, the colder compartment will be safely below zero and the fresh food compartment at a desired keeping temperature above freezing.

The Sylphon bellows is a suitable form of thermally actuated power unit. Other power units other heat motors might be used with equal effect.

The heat exchange flues being interposed between the insulated container wall and the warm chamber serve as additional insulation or heat flow barrier to assist in maintaining the temperature in the warm chamber at a steady state.

I claim:

1. The method of storing food which consists in placing a body of frozen food in a frozen food zone, showering such food with liquid nitrogen at atmospheric pressure until the water of composition of the frozen food has reached a predetermined low point, then closing the zone, placing fresh food at temperature in the order of 29 to 35 degrees F. in a fresh food zone, closing that zone, conducting cold gas from the frozen food zone into heat radiating relationship with the fresh food zone, while preventing entrance of the gas into the fresh food zone.

2. The method of storing food which consists in placing a body of frozen food in a frozen food zone, showering such food with liquid nitrogen at atmospheric pressure until the water of composition of the frozen food has reached a predetermined low point, then closing the zone, placing fresh food at temperature in the order of 29 to 35 degrees F. in a fresh food zone, closing that zone, conducting cold gas from the frozen food zone into heat radiating relationship with the fresh food zone, controlling the rate of gas movement in consonance with change in temperature in the fresh food zone, while preventing entrance of the gas into the fresh food zone.

3. The method of storing perishable food which consists in maintaining the food in two separate, closed, gas containing zones, insulated one from the other and one above the other, maintaining the food in the upper zone at a temperature far below zero degrees F. and maintaining the food in the lower zone at a temperature above freezing by circulating the gas contained in the upper zone and cooled by the food therein in heat exchange relationship with the boundary of, while preventing the entrance of such gas into, the lower zone and controlling the rate of gas circulation independent of the temperature of the upper zone in consonance with variation of temperature of the gas in the lower zone.

4. In an insulated cold storage container, two storage chambers insulated from one another, one above and one below, a tray in the upper chamber adapted to contain perishable material, means in the lower chamber adapted to support perishable material, dead ended heat exchange pockets extending downwardly from the upper chamber along the sides of the lower chamber, closed against escape of gas therefrom, valves between the upper chamber and the heat exchange pockets and means for opening and closing said valves in consonance with change in temperature of the gas in the lower chamber.

References Cited in the file of this patent

UNITED STATES PATENTS

| | | |
|---|---|---|
| 1,864,259 | Small | June 21, 1932 |
| 1,887,693 | Martin | Nov. 15, 1932 |
| 1,900,855 | Aylsworth | Mar. 7, 1933 |
| 2,346,287 | Borgerd et al. | Apr. 11, 1944 |
| 2,529,734 | Lehmann | Nov. 14, 1950 |